(12) United States Patent
Daily et al.

(10) Patent No.: US 7,778,858 B1
(45) Date of Patent: Aug. 17, 2010

(54) LINKING UNABLE TO RESPOND MESSAGES TO ENTRIES IN ELECTRONIC CALENDAR

(75) Inventors: Daniel J. Daily, Westminster, CO (US); Christopher R. Gentle, Gladesville (AU); Lisa Y. Kawahara, Colorado Springs, CO (US); Ashis Kumar Maity, Arvada, CO (US); Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 456 days.

(21) Appl. No.: 11/488,487

(22) Filed: Jul. 17, 2006

(51) Int. Cl.
*G05B 19/418* (2006.01)

(52) U.S. Cl. .................. 705/8; 705/7; 705/9; 709/206; 709/207; 709/224; 709/205; 715/751; 715/752; 715/809

(58) Field of Classification Search ............. 705/7, 705/8, 9; 715/751, 752, 809; 709/205, 206, 709/207, 224
See application file for complete search history.

(56) References Cited

U.S. PATENT DOCUMENTS

| | | |
|---|---|---|
| 4,819,191 A | 4/1989 | Scully et al. |
| 4,831,552 A | 5/1989 | Scully et al. |
| 5,050,077 A | 9/1991 | Vincent |
| 5,124,912 A | 6/1992 | Hotaling et al. |
| 5,197,000 A | 3/1993 | Vincent |
| 5,206,903 A | 4/1993 | Kohler et al. |
| 5,216,603 A | 6/1993 | Flores et al. |
| 5,323,314 A | 6/1994 | Baber et al. |
| 5,428,784 A * | 6/1995 | Cahill, Jr. .................. 709/206 |
| 5,555,346 A * | 9/1996 | Gross et al. .................. 706/45 |
| 5,619,555 A | 4/1997 | Fenton et al. |
| 5,627,978 A | 5/1997 | Altom et al. |
| 5,774,867 A | 6/1998 | Fitzpatrick et al. |
| 5,793,365 A | 8/1998 | Tang et al. |
| 5,813,013 A | 9/1998 | Shakib et al. |
| 5,828,747 A | 10/1998 | Fisher et al. |
| 5,889,945 A | 3/1999 | Porter et al. |
| 5,893,073 A | 4/1999 | Kasso et al. |
| 5,905,793 A | 5/1999 | Flockhart et al. |
| 5,920,701 A | 7/1999 | Miller et al. |
| 5,960,406 A | 9/1999 | Rasansky et al. |
| 5,982,873 A | 11/1999 | Flockhart et al. |
| 6,064,976 A | 5/2000 | Tolopka |
| 6,085,166 A | 7/2000 | Beckhardt et al. |

(Continued)

FOREIGN PATENT DOCUMENTS

EP        1014286        6/2000

(Continued)

OTHER PUBLICATIONS

Avaya Case Study (Advertising Agency Uses Avaya Unified Messenger to Streamline Communications, 2003 Avaya Inc.).*

(Continued)

*Primary Examiner*—Beth V. Boswell
*Assistant Examiner*—Alan Miller
(74) *Attorney, Agent, or Firm*—Sheridan Ross P.C.

(57) ABSTRACT

The present invention is directed to the storage of a customized greeting in an on-line calendar entry of a subscriber and providing the customized greeting to a contactor contacting the subscriber when the calendar entry is current.

21 Claims, 6 Drawing Sheets

U.S. PATENT DOCUMENTS

| | | | |
|---|---|---|---|
| 6,101,480 | A | 8/2000 | Conmy et al. |
| 6,147,685 | A | 11/2000 | Bliss et al. |
| 6,163,607 | A | 12/2000 | Bogart et al. |
| 6,173,053 | B1 | 1/2001 | Bogart et al. |
| 6,192,111 | B1 | 2/2001 | Wu |
| 6,192,122 | B1 | 2/2001 | Flockhart et al. |
| 6,272,074 | B1 | 8/2001 | Winner |
| 6,360,217 | B1 | 3/2002 | Gopal et al. |
| 6,363,352 | B1 | 3/2002 | Dailey et al. |
| 6,377,965 | B1 | 4/2002 | Hachamovitch et al. |
| 6,434,571 | B1 | 8/2002 | Nolte |
| 6,570,555 | B1 | 5/2003 | Prevost et al. |
| 6,594,637 | B1 | 7/2003 | Furukawa et al. |
| 6,640,230 | B1* | 10/2003 | Alexander et al. .................. 1/1 |
| 6,662,309 | B2 | 12/2003 | Ando et al. |
| 6,675,356 | B1 | 1/2004 | Adler et al. |
| 6,694,335 | B1 | 2/2004 | Hopmann et al. |
| 6,988,128 | B1* | 1/2006 | Alexander et al. .......... 709/206 |
| 7,007,235 | B1 | 2/2006 | Hussein et al. |
| 7,016,909 | B2 | 3/2006 | Chan et al. |
| 7,082,402 | B2 | 7/2006 | Conmy et al. |
| 7,113,797 | B2 | 9/2006 | Kelley et al. |
| 7,130,885 | B2 | 10/2006 | Chandra et al. |
| 7,149,810 | B1 | 12/2006 | Miller et al. |
| 7,155,435 | B1 | 12/2006 | Day et al. |
| 7,187,384 | B2 | 3/2007 | Noyle |
| 7,188,073 | B1 | 3/2007 | Tam et al. |
| 7,254,569 | B2 | 8/2007 | Goodman et al. |
| 7,343,312 | B2 | 3/2008 | Capek et al. |
| 7,343,313 | B2 | 3/2008 | Dorenbosch et al. |
| 7,363,590 | B2 | 4/2008 | Kerr et al. |
| 7,383,291 | B2 | 6/2008 | Guiheneuf et al. |
| 7,383,303 | B1* | 6/2008 | Bort ........................... 709/206 |
| 7,395,221 | B2 | 7/2008 | Doss et al. |
| 7,436,654 | B2 | 10/2008 | Cho |
| 7,440,961 | B1 | 10/2008 | Matousek |
| 7,519,672 | B2 | 4/2009 | Boss et al. |
| 2001/0054072 | A1* | 12/2001 | Discolo et al. ............... 709/206 |
| 2002/0085701 | A1* | 7/2002 | Parsons et al. ......... 379/211.01 |
| 2002/0117847 | A1 | 8/2002 | Ede et al. |
| 2002/0120600 | A1* | 8/2002 | Schiavone et al. ............. 707/1 |
| 2002/0144136 | A1 | 10/2002 | Stornetta et al. |
| 2003/0046296 | A1 | 3/2003 | Doss et al. |
| 2003/0069880 | A1 | 4/2003 | Harrison et al. |
| 2003/0149606 | A1 | 8/2003 | Cragun et al. |
| 2003/0154293 | A1 | 8/2003 | Zmolek |
| 2003/0163537 | A1 | 8/2003 | Rohall et al. |
| 2003/0193558 | A1* | 10/2003 | Doss et al. ............... 348/14.01 |
| 2004/0054726 | A1* | 3/2004 | Doss et al. ................... 709/205 |
| 2004/0128181 | A1 | 7/2004 | Zurko et al. |
| 2004/0192857 | A1 | 9/2004 | Borer et al. |
| 2004/0199663 | A1 | 10/2004 | Horvitz et al. |
| 2004/0254998 | A1* | 12/2004 | Horvitz ...................... 709/206 |
| 2005/0069099 | A1* | 3/2005 | Kozdon et al. ........... 379/88.13 |
| 2005/0125246 | A1 | 6/2005 | Muller et al. |
| 2005/0125248 | A1 | 6/2005 | Butterworth et al. |
| 2005/0165631 | A1 | 7/2005 | Horvitz |
| 2005/0192857 | A1 | 9/2005 | Levine |
| 2005/0198144 | A1 | 9/2005 | Kraenzel et al. |
| 2006/0004843 | A1 | 1/2006 | Tafoya et al. |
| 2006/0020889 | A1 | 1/2006 | Coppinger et al. |
| 2006/0031326 | A1* | 2/2006 | Ovenden .................... 709/206 |
| 2006/0031470 | A1* | 2/2006 | Chen et al. .................. 709/224 |
| 2006/0047557 | A1 | 3/2006 | Bieselin et al. |
| 2006/0069686 | A1 | 3/2006 | Beyda et al. |
| 2006/0184584 | A1 | 8/2006 | Dunn et al. |
| 2006/0190485 | A1 | 8/2006 | Adams et al. |
| 2006/0242109 | A1 | 10/2006 | Pereira et al. |
| 2007/0118415 | A1 | 5/2007 | Chen et al. |
| 2007/0174104 | A1 | 7/2007 | O'Sullivan et al. |
| 2008/0005685 | A1 | 1/2008 | Drews et al. |
| 2008/0034425 | A1 | 2/2008 | Overcash et al. |
| 2008/0037733 | A1 | 2/2008 | Chen et al. |

FOREIGN PATENT DOCUMENTS

| | | |
|---|---|---|
| EP | 1560138 | 8/2005 |
| WO | WO 2005/010715 | 2/2005 |

OTHER PUBLICATIONS

Avaya Press Release (Avaya Introduces IBM Lotus Domino Version of Its Market-Leading Unified Messaging Software, http://www.avaya.com/usa/Error404.aspx?currentpath=master-usa/en-us/corporate/pressroom/pressreleases/2003/pr-03, Jan. 27, 2003).*

Avaya Unified Messenger Client User Guide (2002 Avaya Inc.) Avaya Web Pages (Retrieved Archive.org from Jun. 13, 2004).*

Avaya Unified Messenger Solution—Microsoft Exange 2000 version Installation Guide (2002 Avaya Inc.) Avaya Unified Messenger Solution—Microsoft Exange 2000 version (2002 Avaya Inc.).*

U.S. Appl. No. 11/396,175, Blair et al.

http://en.wikipedia.org/wiki/Microsoft_Outlook; printed Mar. 14, 2006; 4 pages.

http://www.bcentral.co.uk/products/microsoft-outlook.mspx; printed Mar. 14, 2006; 2 pages.

Chapters 4, 5 and 7 from Microsoft® Office Outlook® 2003; "Step by Step"; Online Training Solutions, Inc.

http://freebusy.4team.biz/; printed May 24, 2006; 4 pages.

U.S. Appl. No. 10/770,640, filed Feb. 2, 2004, Mohler.

U.S. Appl. No. 11/350,050, filed Feb. 7, 2006, Atkins et al.

U.S. Appl. No. 11/554,442, filed Oct. 30, 2006, Atkins et al.

U.S. Appl. No. 11/554,478, filed Oct. 30, 2006, Atkins et al.

U.S. Appl. No. 11/554,497, filed Oct. 30, 2006, Chu et al.

U.S. Appl. No. 11/619,145, filed Jan. 2, 2007, Atkins et al.

U.S. Appl. No. 11/669,707, filed Jan. 31, 2007, Blair et al.

"Avaya™ Unified Communication Center (UCC) Speech Access Solution", Avaya, Inc. (2002), 4 pages.

"How to Use A TTY", NETAC Teacher Tipsheet, htt://72.14.203.104/search?q=cache:JdktLkxPgMUJ:www.netac.rit.edu/downloads/TPSHT_TTY.pdf+%22teletypewriter%22+... (1999) 4 pages.

"Meetings in America", MCI Conferencing, available at http://e-meetings.mci.com/meetingsinamerica/uswhitepaper.php3, website updated Aug. 19, 2003, pp. 1-12.

"TTY Brochure Feb. 2006", http://72.14.203.104/search?q=cache:O3tW0eQtbTEF:ods.utk.edu/brochures/TTYBrochureFebruary2006.pdf+%22teletypewrite... (Feb. 2006) 3 page.

"WebAccess Client User Guide" Novell GroupWise 6.5, Oct. 31, 2005, 68 pages.

AIM Acronym Dictionary, http://www.aim.com/acronyms.adp (Jan. 16, 2007) 7 pages.

AIM Bots, http://developer.aim.com/botMain.jsp (2006) 2 pages.

AIM Buddy Info, http://buddyinfo.aim.com/ (2006) 2 pages.

AIM Presence Services, http://developer.aim.com/presenceMain.jsp (2006) 2 pages.

Arthur M. Rosenberg and David A. Zimmer, "Beyond VoIP: Enterprise Perspectives On Migrating To Multi-Modal Communications And Wireless Mobility", (Oct. 2004) 38 pages.

Arthur M. Rosenberg and David A. Zimmer, "Migrating to Enterprise-Wide Communications: The Branch Office Dilemma", May 2003, 14 pages.

Avaya by Example; Three-Week Wonder: Avaya Unified Communication Center Speech Access Gives Road Warriors 15 Additional Days Each Year, Avaya, Inc. (2005) 3 page.

Boyce, "Microsoft Office Outlook 2003 Inside Out," Nov. 5, 2003, Microsoft Press, Chapters 1, 19, 20.

Dave Anderson and George McNeill, "Artificial Neural Networks Technology", http://www.dacs.dtic.mil/techs/dacs_reports/text/neural_nets.txt (Aug. 20, 1992) 145 pages.

Dey et al., CybreMinder: A Context-Aware System for Supporting Reminders, Handheld and Ubiquitous Computing: Second International Symposium, HUC 2000, Bristol, UK, Sep. 2000. Proceedings, Jul. 31, 2003, 15 pages, vol. 1927/2000, Springer Berlin/Heidelberg.

http://www.effectivemeetings.com (SMART Technologies, Inc., May 2003).

Ivtta Turin 98, "The Linguistic Components Of The REWARD Dialogue Creation Environment And Run Time System", http://cpk.auc.dk/~tb/articles/ivtta98.htm (Sep. 1998) 13 pages.

Online Training Solutions, Inc., "Step by Step," Microsoft Outlook 2003, Copyright 2004, pp. 1-119, USA.

Online Training Solutions, Inc., "Step by Step," Microsoft Outlook 2003, Copyright 2004, pp. 120-225, USA.

Online Training Solutions, Inc., "Step by Step," Microsoft Outlook 2003, Copyright 2004, pp. 226-334, USA.

Rob Kassel, "How Speech Recognition Works", http://www.microsoft.com/speech/docs/How_Speech_Works_Article.htm (Nov. 30, 2004) 4 pages.

Tony Vitale, "Hardware and Software Aspects Of A Speech Synthesizer Developed for Persons With Disabilities", http://codi.buffalo.edu/archives/computing/.dec.speech (1993).

Yin "[Design] linking and grouping items", available at http://lists.osafoundation.org/pipermail/design/2005-August/003159.html Aug. 1, 2005, pp. 1-2.

Background of the Invention for the above-captioned application (previously provided).

AvantGo: AvantGo launches new release of Pylon products; AvantGo Pylon 5.1 offers new support for Domino 6, Palm OS 5 and custom repeating meetings M2 Presswire. Coventry: Jan 24, 2003. p. 1-4.

"Special Edition Using Lotus Notes and Domino 5" (Published by Que, Aug. 23, 1999, ISBN 0-7897-1814-6.

"Windows Client User Guide" (Novell Groupwise 7.0, Mar. 14, 2008, copyright 2005-2008) discloses Groupwise 7.0 (released Aug. 15, 2005), 389 pages.

Clayton, Brad "Microsoft Outlook 2003 Enhancements", modified Apr. 19, 2004, Purdue University, 4 pages.

Boyce, "Microsoft Office Outlook 2003 Inside Out," Nov. 5, 2003, Microsoft Press, Chapter 2.

\* cited by examiner

Fig. 5

File  Edit  View  Insert  Format  Tools  Actions  Help

Save and Close  Recurrence  Invite Attendees  — 516

Appointment | Scheduling

Subject: Meeting with John Smith
Location: 1500 Park Avenue Suite 1000        Label: None
                                              ☐ All day Event
Start Time: Wed 5/31/2010   9:00 AM
End Time:   Wed 5/31/2010   11:30 AM
☑ Reminder: 15 Minutes     Show Time as: Busy
Customized Greeting: Yes  No
                      — 512

All,
We need to discuss potential sales deal with ACME.
Please be prepared to discuss price and terms.

508
504
500

7,778,858 B1

LINKING UNABLE TO RESPOND MESSAGES TO ENTRIES IN ELECTRONIC CALENDAR

FIELD OF THE INVENTION

The invention relates generally to enterprise scheduling applications and particularly to calendaring applications.

BACKGROUND OF THE INVENTION

E-mail programs, such as Microsoft Outlook™ and Lotus Notes™, allow one to administer an out-of-office message that is sent to e-mail senders while the person is out. In Outlook™, the user must remember to enable the message before he or she departs, and, in Notes™, the user can schedule the time during which the application will send the message.

Similarly, voice messaging systems, such as Avaya Modular Messaging™, allow a user to set up an "I cannot answer now" greeting. In some systems, a greeting can be scheduled.

Personal information managers, such as Microsoft Outlook™, provide calendar, task, and contact management, note taking, journal ability, and e-mail service. It can be used as a stand-alone application but can also operate in conjunction with Microsoft Exchange Server™ to provide enhanced functions for multiple users in an organization, such as shared mailboxes and calendars, public folders, and meeting time allocation.

E-mail applications, voice messaging systems, and personal information managers are not converged so that out-of-office messages are linked to electronic calendar entries.

Today, the average person has multiple communications tools, such as a wired telephone, mobile telephone, Personal Digital Assistant or PDA, personal computer, and laptop computer and numerous messaging vehicles, such as voice mail, e-mail, text chat, and instant messaging. The proliferation of communication tools has created a need to manage them. For example, a separate out-of-office message must be configured for each separate communication tool/vehicle.

Although there have been suggestions to automated generation of out-of-office messages using templates bound to a trigger event. Each template includes data indicating the type of triggering event for which the template should be selected, such as "busy" and "out-of-office" indicators and keywords or codes detected in the calendar. However, in such systems the user has no ability to customize the greeting by device or communication source. Moreover, the greeting is triggered by a calendar entry but it is not part of the entry. In other words, the greeting is generated using rules.

SUMMARY OF THE INVENTION

These and other needs are addressed by the various embodiments and configurations of the present invention. The present invention is directed generally to the automatic generation of customized greetings to contactors based upon a subscriber's current calendar entries.

In a first embodiment of the present invention, a method is provided that includes the steps:
 (a) receiving, from a contactor, a contact for a first subscriber, the contact having a first timestamp;
 (b) determining, from an electronic calendar, whether the first subscriber is unavailable at the time of the first timestamp;
 (c) when the first subscriber has a first electronic calendar entry indicating that he is unavailable at the time of the first timestamp, retrieving from a storage location of the first electronic calendar entry and/or from a storage location linked to the first electronic calendar entry a customized greeting previously received from the first subscriber; and
 (d) providing the customized greeting to the contactor.

In a second embodiment, a method is provided that includes the steps:
 (a) receiving a first electronic calendar entry from a first subscriber;
 (b) at the time that the first electronic calendar entry is received from the first subscriber, receiving from the first subscriber a first customized greeting to be provided to contactors when the first electronic calendar entry is current; and
 (c) storing the first customized greeting at and/or linked to the storage location of the first calendar entry.

The present invention can permit a subscriber to administer a customized greeting, such as an "unable-to-respond" message, for any entry on a subscriber's electronic calendar. This allows the subscriber to customize the message for each calendar entry and to set up the message at the time the entry is added. The message can be sent in email, played as a voice greeting, or used as an instant messaging response. Thus, the subscriber can administer the message (e.g., set-it-and-forget-it) at the time the subscriber adds the event or calendar entry. The message can be either text or voice, and the subscriber can choose to use it as either a voice greeting, email response, or instant messaging response. The same message can be used as an email response, voice greeting, or instant messaging response. A text message can be converted to speech if used for a voice greeting or a voice greeting can be converted to text for instant messaging. Compared to a rule-based automated response system, entering the greeting as part of a calendar entry is much easier than setting up a rule to generate the message.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 5 is a screen shot of a search request according to an embodiment of the present invention.

DETAILED DESCRIPTION

Figure 1:
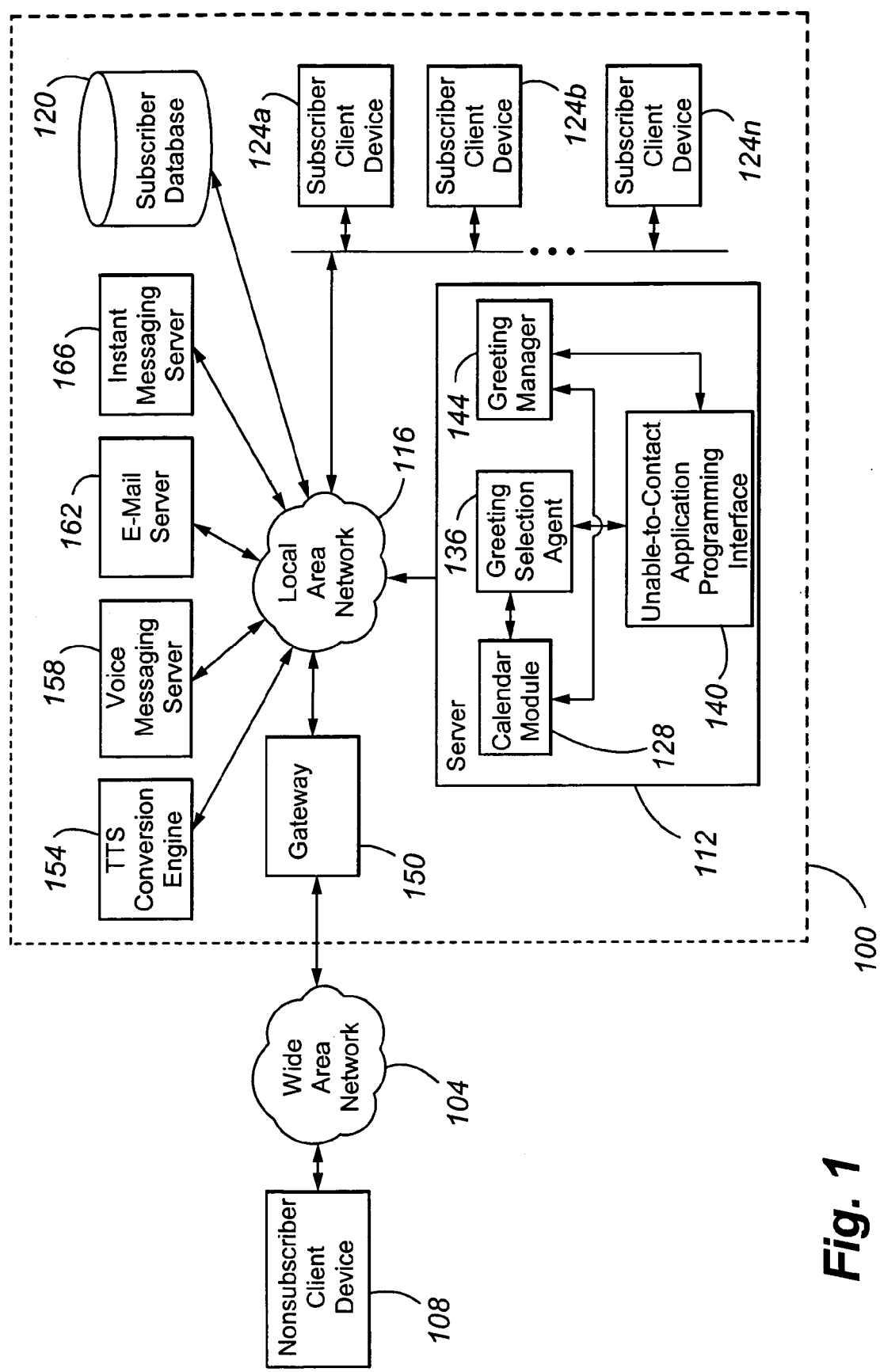
FIG. 1 is a block diagram depicting an enterprise server providing personal information management for enterprise subscribers according to an embodiment of the present invention.

FIG. 1 depicts an architecture according to an embodiment of the present invention. The enterprise network 100 is in communication, via a Wide Area Network or WAN 104, with one or more nonsubscriber client devices 108. The enterprise network 100 includes a server 112 in communication, via Local Area Network 116, with a gateway 150, Text-To-Speech or TTS conversion engine 154, voice messaging server 158, e-mail server 162, instant messaging server 166, subscriber database 120 and a plurality of subscriber client devices 124a-n. The server 112 can be a computer system having a processor and memory, where the memory can store and the processor can execute software modules, software components, or software instructions.

The WAN 104 may be a packet-switched network, such as the Internet, using the TCP/IP suite of protocols or a circuit-switched network, such as the Public Switched Telephone Network or PSTN or a wireless cellular services network, and LAN 116 is commonly a packet-switched network using an Ethernet protocol. As will be appreciated, other protocols may be employed depending on the application.

The client devices 108 and 124a-n can be wired or wireless. Examples of suitable client devices include a Personal Computer, a laptop computer, a Personal Digital Assistant, telephony endpoints and applications that support calendar functions, and the like.

The gateway 150 is conventional.

The TTS conversion engine 154 converts text into corresponding speech and is conventional.

The enterprise network 100 includes a number of messaging servers. The voice messaging server 158 receives from callers, stores, manages, and provides to subscribers voice messages. The e-mail server 162 receives, stores, administers, and provides to subscribers e-mail. Each subscriber has a message box containing their stored messages. Instant messaging server 166 receives and provides to the subscriber instant messages. In one configuration, two or more of the messaging servers are integrated, as in the case of Modular Messaging™ by Avaya, Inc.

The subscriber database 120 includes subscriber information, such as subscriber identities, electronic addresses, scheduling information (e.g., calendars), task lists, contact management information and preferences, public folders, and organization and areas of responsibility.

Figure 2:
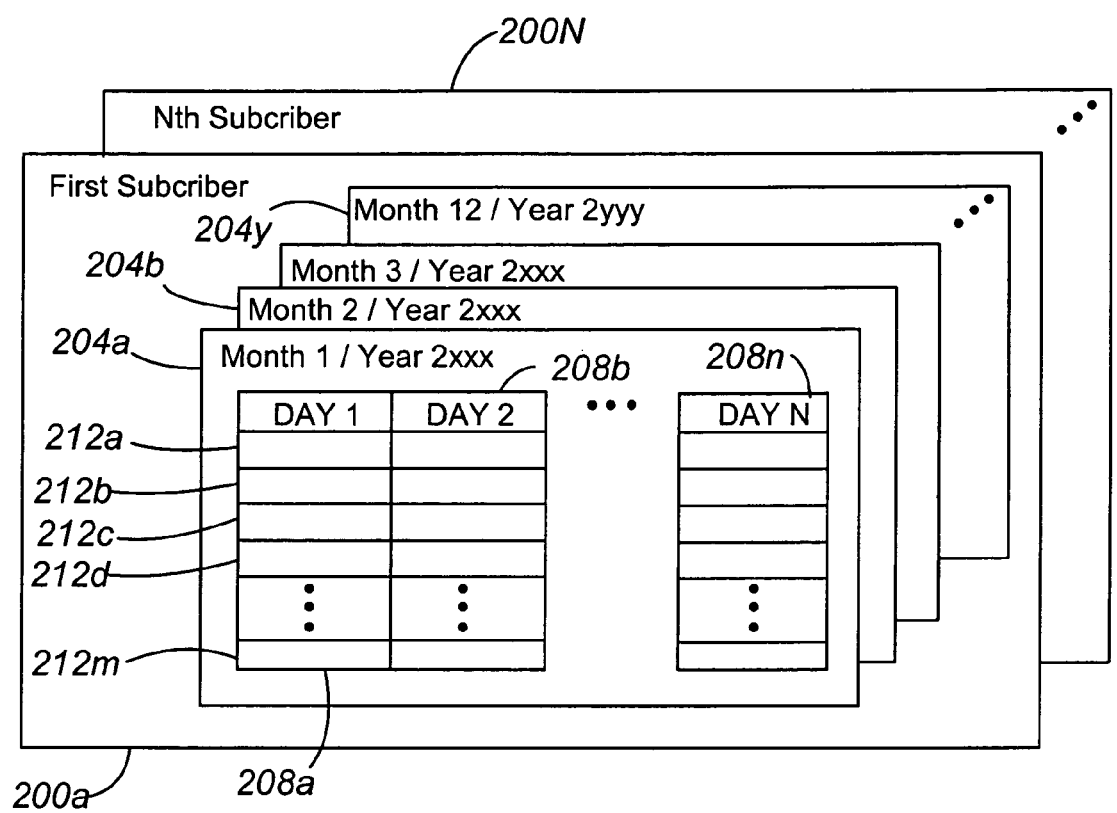
FIG. 2 is a prior art depiction of a set of personal information data structures for enterprise subscribers.

An example of a set of data structures used for scheduling information is shown in FIG. 2. The data structures include a number of sets of scheduling records 200a-n for each of the first through nth subscribers. Each set of scheduling records 200a-n includes a set of calendar files 204a-y. Each calendar file 204 corresponds to a selected month and year and includes, for each day 208a-n in the respective month and year, a series of discrete timeslots 212a-m.

Each timeslot corresponds to a discrete time period of a set length, e.g., fifteen, thirty, or sixty minutes. Each timeslot may have an associated set of parameters, such as a task to be performed, a meeting, a list of meeting participants, a subject of the meeting, an agenda for the meeting, attachments for the meeting, a duration of the meeting, contact details for the meeting (e.g., a telephone number of a meeting participant, conference bridge, and the like), physical location, and one or more customized greetings. The parameters are typically referenced in the appropriate timeslot by a pointer or other type of link. As will be appreciated, when the same timeslot of a number of individuals corresponds to the same meeting, the timeslots normally contain or point to identical meeting information.

Referring again to FIG. 1, the server 112 includes a number of computational modules, specifically the calendar module 128 which receives and executes scheduling requests and updates and meeting invitations from a subscriber, a greeting manager 144 which interfaces with subscribers to receive and store, as part of one or more calendar entries, customized greetings, greeting selection agent 136 that receives contacts, selects an appropriate default or customized greeting, and provides the selected greeting to the contactor, and unable-to-contact Application Program Interface or API 140 that processes Structured Query Language or SQL database queries received from the foregoing components.

The calendar module 128 is conventional.

The customized greeting, which is stored as part of one or more calendar entries, is commonly played, via TTS conversion engine 154, to callers as a voice equivalent or transmitted to text message senders (which includes all form of text messages including e-mails and instant messages) as a text equivalent to what is stored as the customized greeting. The greeting is provided to contactors, in the form in which it is stored, while the calendar entry is current, or active.

There is no need for the subscriber to enable or disable the greeting. When the calendar entry is current (or is active), the greeting is provided automatically to contactors. When the calendar entry is no longer current (or is inactive), the greeting is no longer provided automatically to contactors.

The greeting, as stored, may be supplemented when played to a contactor. For example, a default prologue, such as "Hi! This is X", and/or an epilogue, such as "Please leave a message after the beep" or "Thanks you and have a nice day"), that is not part of the customized greeting as stored, may be provided before or after, respectively, the customized greeting.

The greeting manager 144 administers the customized greeting for any entry on the electronic calendar. This would allow the subscriber to customize the greeting, for each calendar entry. It also permits the subscriber to set up the customized greeting at the time that the calendar entry is added or otherwise entered. As noted, the customized greeting can be sent in an email, played as a voice greeting, or used as an instant messaging response.

Figure 3:
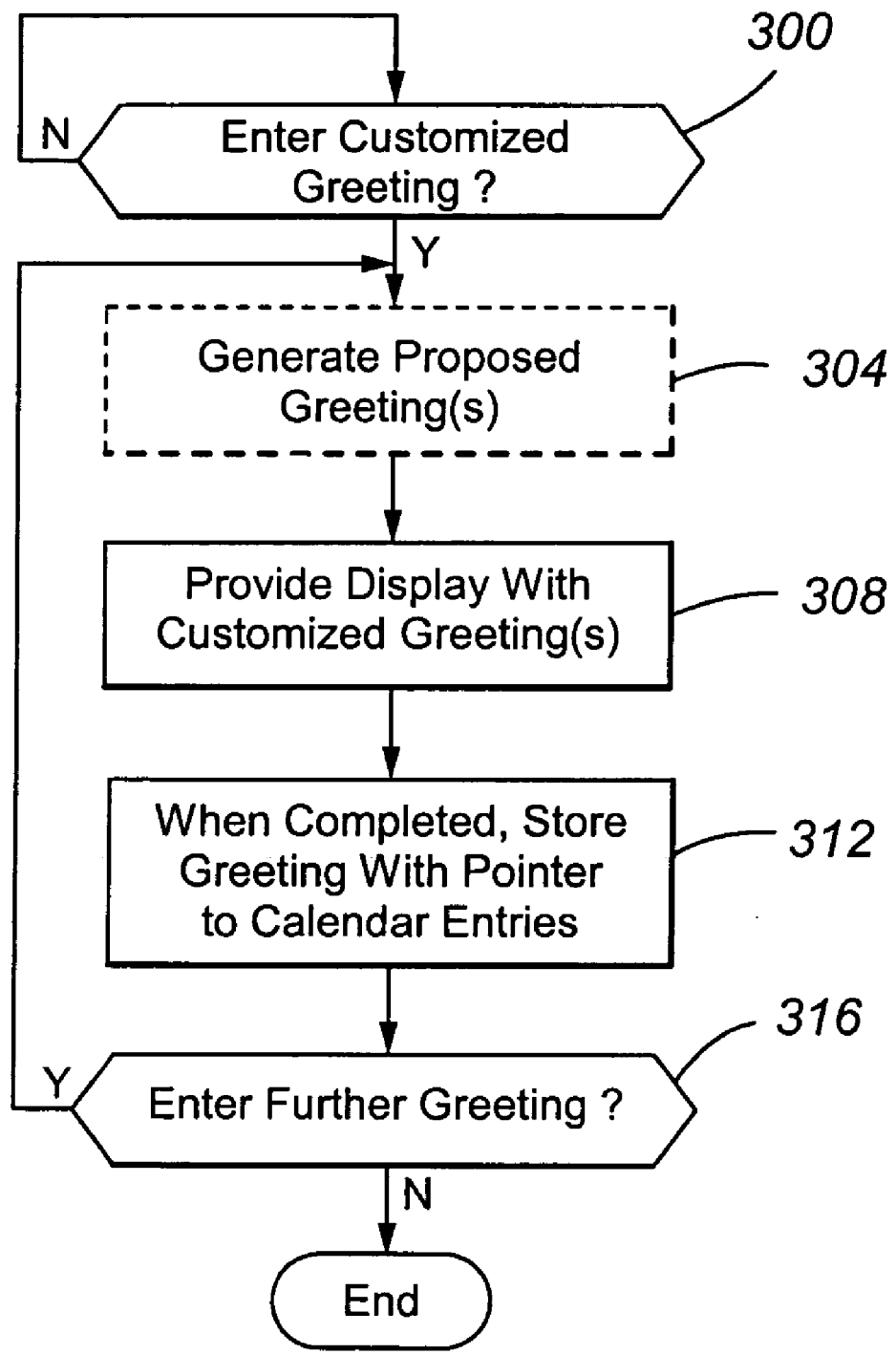
FIG. 3 is a flow chart of greeting manager operation according to an embodiment of the present invention.

FIG. 3 shows the operation of the greeting manager 144 according to an embodiment of the invention.

The process starts when a calendar entry is created or edited. Referring to FIG. 5, a screen shot 500 of a calendar module 128 display is depicted. The window is shown as it is displayed for a subscriber creating a new or editing an old calendar entry. The subject of the meeting is "Meeting with John Smith" of Acme Corporation, the location "1500 Park Avenue Suite 1000", the start time "9 AM on Wednesday May 31, 2010", and end time "11:30 AM Wednesday May 31". The description of the meeting is shown in subscriber-entry box 504. A customized greeting option 508 permits the subscriber, by checking the "Yes" icon 512, to enter a customized greeting for contactors during the time scheduled for the meeting (i.e., 9 to 11:30 AM on May 31, 2010).

Referring now to FIG. 3, when a calendar entry is created, the manager 144 determines in decision diamond 300 whether the subscriber desires to enter a customized greeting. Referring to FIG. 5, the manager 144 knows that the subscriber desires to enter a customized greeting when the subscriber clicks on the icon 512.

In response to clicking on the icon 512, the manager 144, in optional step 304, can apply rules or templates to generate a set of proposed greetings for consideration by the subscriber. The rules or templates can themselves be configured by the subscriber. In one configuration, the subscriber can specify, when the entry is created, a type of calendar entry, e.g., an out-of-office meeting entry, an in-the-office meeting entry, a telephone-conference entry, a vacation entry, and an outside-of-business hours entry, that is used for selecting an appropriate set of proposed customized greetings for consideration by the subscriber. When a customized greeting is created by the subscriber, the subscriber can indicate whether or not to have the greeting used as a proposed customized greeting for the type of calendar entry for which it was created. In that event, the user can specify fields in the message to be populated automatically by information in future calendar entries of the same type.

Figure 6:
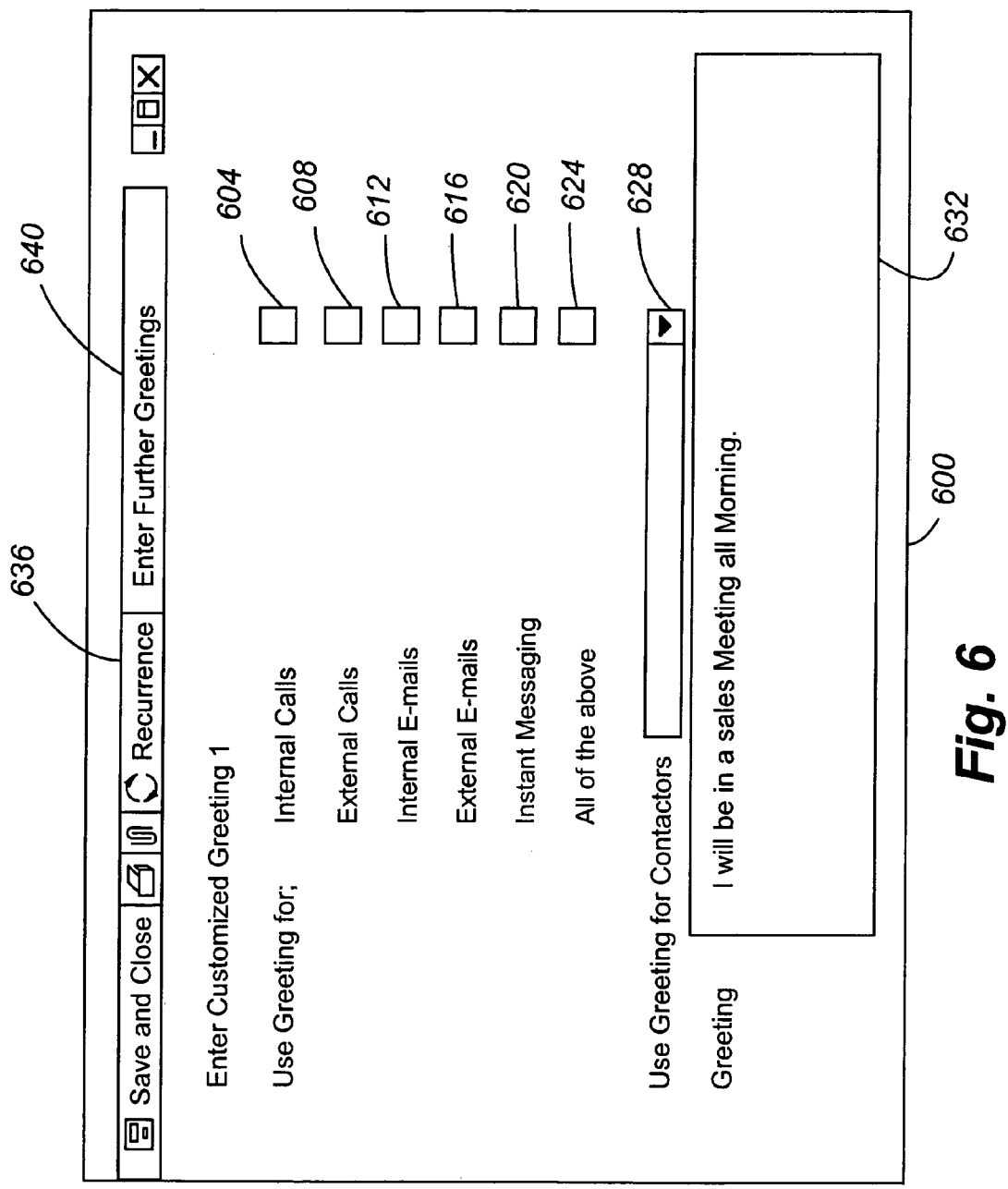
FIG. 6 is a screen shot of a meeting merger invitation according to an embodiment of the present invention.

In any event, the manager 144, in step 308, provides the display of FIG. 6, which is a child window 600 of the window 500, to the subscriber. The window 600 includes the following fields: use greeting for internal calls 604 (or calls from other subscribers), use greeting for external calls 608 (or calls from non-subscribers), use greeting for internal emails 612 (or emails from other subscribers), use greeting for external emails (or emails from non-subscribers), use greeting for instant messaging 620, all of the above 624, use greeting for designated users 628, and the box 632 for receiving the customized greeting from the subscriber. Fields 604-624 permit the greeting to be used for specified modalities of communication while field 628 permits the greeting to be used for specified sets of contactors. For example, the subscriber may provide contact information, such as a private cell phone number, for a family member or business acquaintance. As will be appreciated, the box-type fields 604, 608, 612, 616, 620, and 624 could be implemented as a multiple selectable pull-down menu that could list the depicted and additional contact types.

Alternatively or additionally, a field (not shown) could be provided for contactors for whom the greeting is not to be used. The greeting box 632 contains the subscriber selected or entered greeting "I will be in a sales meeting all morning". As can be seen in FIG. 6, the subscriber may select the "recurrence icon" 636, which causes the selected or entered greeting to be used for multiple calendar entries (which are generated by selecting the recurrence icon 516 of FIG. 5). As will be appreciated, a recurring meeting is a meeting that occurs with a selected frequency or periodicity over time.

In step 312, the manager 144, when the save and close command is received, stores the greeting and related information itself or a pointer to the storage location of the greeting and related information in the pertinent calendar entry or entries. In the latter case, a pointer to the relevant calendar entries may be stored at the storage location of the greeting and related information.

In decision diamond 316, the manager 144 determines whether the subscriber has activated the "enter further greetings" icon 640 in FIG. 6. This capability permits a subscriber to enter a number of differing customized greetings for a common calendar entry. This may be desirable, for example, where a subscriber wants to use different greetings for different modalities of communication (e.g., fields 604-620) and/or for different sets of contactors (field 628).

When the subscriber wishes to enter a further greeting, the first greeting shown in FIG. 6 is saved and the window 600 refreshed with a new window having the various fields 604-628 blank. Depending on the configuration, the field 632 may be blank or contain the previously entered greeting in box 632 for editing by the subscriber.

Figure 4:
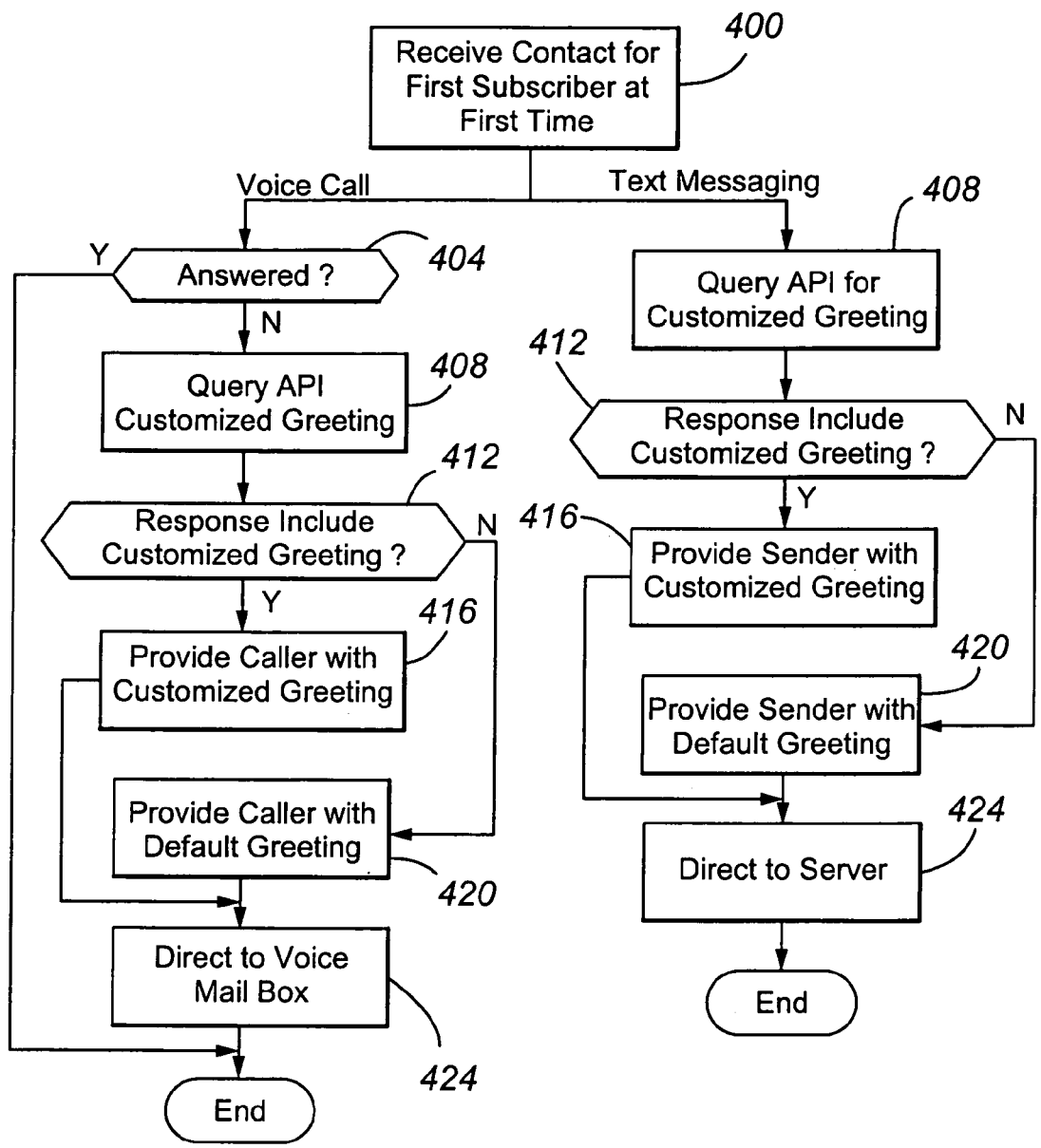
FIG. 4 is a flow chart of greeting selection agent operation according to an embodiment of the present invention.

The operation of the greeting selection agent 136 will now be discussed with reference to FIG. 4.

In step 400, the agent 136 is notified when a contact is received for a first or selected subscriber at a first time. The further steps performed depend on whether the contact is a voice call (left logic branch) or text message (right logic branch).

When the incoming contact is a voice call, the agent 136 determines, in decision diamond 404, whether the call has been answered by the subscriber. If so, there is nothing for the agent 136 to do. If not, the agent 136 queries the API 140, in step 408, for customized greeting information, if any. The query to the API 140 includes the identity of the first subscriber or called subscriber client device 124, the identity of the caller or caller's communication device 108, the timestamp of the call (e.g., when the call was received), the type of incoming call (e.g., internal or external), and the like. The API 140 accesses the subscriber database 120 and determines whether the identified first subscriber has an active calendar entry covering the period of the timestamp, if so whether the first subscriber has entered a customized greeting, and if so whether the customized greeting is to be used for the caller or caller communication device and/or type of call. The API 140 returns a response including an indicator whether a customized greeting is to be used and, if so, a pointer to the storage location of the customized greeting.

In decision diamond 412, the agent 136 determines whether the response indicates whether a customized greeting is to be provided. If so, the agent 136 causes the appropriate customized greeting to be provided to the caller in step 416. If not, the agent 136 causes a default greeting to be provided to the caller in step 420.

In step 424, the call is then directed to the voice mail box of the first subscriber so that the caller may leave a voice mail message.

When the incoming contact is a text message, the agent 136, in step 408, queries the API 140 for customized greeting information, if any. While an analog to decision diamond 404 is not shown in the text messaging logic branch, one could be included for near-real time text messaging modalities, such as instant messaging. In that event, an out-of-office message is formulated and sent after a specified amount of time passes without a response by the recipient of the message. The query to the API 140 includes the identity of the first subscriber or messaged subscriber client device 124, the identity of the sender or sender's communication device 108, the timestamp of the message (e.g., when the message was received), the type of incoming message (e.g., internal email, external email, and instant message), and the like. The API 140 accesses the subscriber database 120 and determines whether the identified first subscriber has an active calendar entry covering the period of the timestamp, if so whether the first subscriber has entered a customized greeting, and if so whether the customized greeting is to be used for the contactor or contactor communication device and/or type of contact. The API 140 returns a response including an indicator whether a customized greeting is to be used and, if so, a pointer to the storage location of the customized greeting.

In decision diamond 412, the agent 136 determines whether the response indicates whether a customized greeting is to be provided. If so, the agent 136 causes the appropriate customized greeting to be provided to the contactor in step 416. If not, the agent 136 causes a default greeting to be provided to the contactor in step 420.

In step 424, the contact is then directed to the pertinent message.

A number of variations and modifications of the invention can be used. It would be possible to provide for some features of the invention without providing others.

For example, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving, from a first contactor and at an input, a first contact for a first subscriber, the first contact having a first timestamp and a first communication modality, wherein the first contactor is of a first type, and wherein the first type is at least one of an internal contactor or an external contactor;
   (b) determining, by a server, from an electronic calendar, that the first subscriber has a first electronic calendar entry indicating that the first subscriber is unavailable at the time of the first timestamp, wherein two or more customized greetings created by the first subscriber are associated with the first electronic calendar entry and stored in a storage location with the first calendar entry;
   (c) determining, by the server, the first communication modality used by the first contact;
   (d) based on the first communication modality and the first type of the first contact, retrieving, by the server, from the storage location of the first electronic calendar entry a first customized greeting;
   (e) providing, by the server, the first customized greeting to the contactor;
   (f) receiving, from a second contactor and at the input, a second contact for a first subscriber, the second contact having a second timestamp and a second communication modality, wherein the second contactor is of a second type, and wherein the second type is at least one of an internal contactor or an external contactor;
   (g) determining, by the server, from the electronic calendar, that the first subscriber has the first electronic calendar entry indicating that the first subscriber is unavailable at the time of the second timestamp;
   (h) determining, by the server, the second communication modality used by the second contact;
   (i) based on the second communication modality and the second type of the second contact, retrieving, by the server, from the storage location of the first electronic calendar entry the second customized greeting;
   (j) providing, by the server, the second customized greeting to the second contactor; and
   wherein the first customized greeting and the second customized greeting are different and wherein the first type and second type are based on contact information for the first contactor and a second contactor.

2. The method of claim 1, wherein, for a selected calendar entry, a text message receives the first customized greeting and a live voice contact the second customized greeting.

3. The method of claim 1, further compromising:
   receiving a third contact from a third contactor having the first modality;
   the server determining that the third contactor is a third type, wherein the third type is at least one of a family member, a friend, or a business acquaintance;
   sending a third customized greeting based on the first modality and the first type;

receiving a fourth contact from a fourth contactor having the second modality;

the server determining that the fourth contactor is a fourth type, wherein the fourth type is based at least on one of a private cell phone number or a business phone number; and the server sending a fourth customized greeting based on the second modality and the second type.

4. The method of claim 1, wherein the first customized greeting and the second customized greeting are stored at a storage location linked to the first electronic calendar entry.

5. The method of claim 1, wherein the first contact is a live voice communication and wherein the first customized greeting is stored as a text string and wherein a Text-To-Speech ("TTS") conversion engine converts the text string to a voice equivalent, the voice equivalent being provided to the contactor.

6. The method of claim 1, wherein a plurality of electronic calendar entries correspond to different types of events and wherein second and third calendar entries correspond to a common type of event and different customized greetings and wherein the first customized greeting and the second customized greeting were stored at the time of creation of the first calendar entry.

7. The method of claim 6, wherein the different types of events are at least one of an out-of-office meeting, an in-the-office meeting, a telephone conference, a vacation, and an outside-of-business hours entry.

8. The method of claim 1, wherein the first customized greeting is not to be used for the second contactor.

9. The method of claim 1, wherein step (a) comprises the substeps:

(A1) determining that the contact is a text message, the text message being one of an instant message and electronic mail message;

(A2) waiting a predetermined period of time to determine if the first subscriber responds to the text message; and (A3) applying the following rules:
when the first subscriber responds during the predetermined period of time, not performing step (e); and
when the first subscriber fails to respond during the predetermined period of time, performing step (e).

10. A computer readable medium, stored on a tangible medium and encoded with machine instructions that, when executed by a server, perform a method, the computer readable medium being in communication with and accessible by a server, the instructions comprising:

instructions to receive, from a first contactor and at an input, a first contact for a first subscriber, the first contact having a first timestamp and a first communication modality, wherein the first contactor is of a first type, and wherein the first type is at least one of an internal contactor or an external contactor;

instructions to determine, from an electronic calendar, that the first subscriber has a first electronic calendar entry indicating that the first subscriber is unavailable at the time of the first timestamp, wherein different first customized greeting and second customized greeting created by the first subscriber are associated with the first electronic calendar entry and stored in a storage location with the first calendar entry;

instructions to determine a first communication modality used by the first contact;

based on the first communication modality of the first contact, instructions to retrieve from the storage location of the first electronic calendar entry the first customized greeting;

instructions to provide the first customized greeting to the contactor;

instructions to receive, from a second contactor and at the input, a second contact for a first subscriber, the second contact having a second timestamp and a second communication modality, wherein the second contactor is of a second type, and wherein the second type is at least one of an internal contactor or an external contactor;

instructions to determine, from the electronic calendar, that the first subscriber has the first electronic calendar entry indicating that the first subscriber is unavailable at the time of the second timestamp;

instructions to determine a second communication modality used by the second contact;

based on the second communication modality of the second contact, instructions to retrieve from the storage location of the first electronic calendar entry the second customized greeting; and instructions to provide the second customized greeting to the contactor.

11. A system, comprising:

a server, the server comprising:
a memory;
a processor in communication with the memory, the processor operable to receive, from a contactor, a contact for a first subscriber, the contact having a first timestamp and the contactor having a first type, and operable to execute:
a calendar module;
a greeting manager in communication with the calendar module;
an unable-to-contact API in communication with the greeting manager, the unable-to-contact API operable to:
in response to the processor receiving the contact, determine, from an electronic calendar, that the first subscriber has a first electronic calendar entry indicating that the first subscriber is unavailable at the time of the first timestamp;
determine a communication modality used by the contact and a type for the contactor, wherein the type is based on one of an identity of the contactor or a type of incoming contact;
a greeting selection agent in communication with the calendar module and the unable-to-contact API, the greeting selection agent operable to:
based on the communication modality of the contact and the type of contactor, retrieve, from a storage location linked to the first electronic calendar entry a customized greeting previously received from the first subscriber, wherein the first electronic calendar entry is associated with two or more customized greetings for two or more communication modalities used by incoming contacts; and
provide the customized greeting to the contactor.

12. The system of claim 11, wherein, for the first calendar entry third customized greeting that is associated with a first type of contactor, wherein the first type is based on an identity of the contactor and the identity is one of a family member, a friend, or a business associate and a fourth customized greeting that is associated with a second type of contactor, wherein the second type is based on the type of incoming contact and the type of incoming contact is one of an internal contact or an external contact.

13. The system of claim 11, wherein, for the first calendar entry, a text message modality receives a first customized greeting and a live voice contact modality receives a second customized greeting.

14. The system of claim 11, wherein the two or more customized greetings are stored at the storage location with the first calendar entry.

15. The system of claim 11, wherein the contact is a live voice communication and wherein the first customized greeting is stored as a text string and wherein a Text-To-Speech ("TTS") conversion engine converts the text string to a voice equivalent, the voice equivalent being provided to the contactor.

16. The system of claim 11, wherein a plurality of electronic calendar entries correspond to different types of events and wherein second and third calendar entries correspond to a common type of event and are associated with different customized greetings.

17. The system of claim 16, wherein the different types of events are at least one of an out-of-office meeting, an in-the-office meeting, a telephone conference, a vacation, and an outside-of-business hours entry.

18. The system of claim 11, wherein the customized greeting is not to be used for a second contactor.

19. The system of claim 11, wherein operation (a) comprises the sub-operations:
   (A1) determine that the contact is a text message, the text message being one of an instant message and electronic mail message;
   (A2) wait a predetermined period of time to determine if the first subscriber responds to the text message; and
   (A3) thereafter apply the following rules:
      when the first subscriber responds during the predetermined period of time, not perform operation (e); and
      when the first subscriber fails to respond during the predetermined period of time, perform operation (e).

20. A method, comprising:
   (a) receiving, from a first contactor and at an input, a first contact for a first subscriber, the first contact having a first timestamp and a first communication modality, the first contactor having a first type, wherein the first type is at least one of an internal contactor or an external contactor;
   (b) determining, by a server, from an electronic calendar, that the first subscriber has a first electronic calendar entry indicating that the first subscriber is unavailable at the time of the first timestamp;
   (c) determining, by the server, that the first contactor is of the first type;
   (d) determining, by the server, that the first electronic calendar entry is associated with at least a first customized greetings previously received from the first subscriber;
   (e) determining, by the server, that the first contact is a text message, the text message being one of an instant message and electronic mail message;
      (E1) determining, by the server, a communication modality used by the contact; wherein the first electronic calendar entry is associated with differing customized greetings for differing communication modalities used by incoming contacts;
   (f) waiting, by the server, a predetermined period of time to determine if the first subscriber responds to the text message; and
   (g) applying, by the server, the following rules:
      (G1) when the first subscriber responds during the predetermined period of time, not providing, by the server, the first customized greeting to the first contactor; and
      (G2) when the first subscriber fails to respond during the predetermined period of time and in response to determining that the first contact is a text message and determining that the first contactor is of the first type, wherein the first type is based on an identity of the first contactor, the-server retrieving, by the server, from a storage location of the first electronic calendar entry the first customized greeting and providing, by the server, the first customized greeting to the first contactor.

21. The method of claim 20, wherein the first customized greeting is not to be used for a second contactor.

* * * * *